United States Patent
Zeine et al.

(10) Patent No.: US 11,146,093 B2
(45) Date of Patent: Oct. 12, 2021

(54) ACTIVELY MODIFYING OUTPUT VOLTAGE OF A WIRELESSLY CHARGEABLE ENERGY STORAGE APPARATUS

(71) Applicant: Ossia Inc., Bellevue, WA (US)

(72) Inventors: Hatem Ibrahim Zeine, Bellevue, WA (US); Benjamin Todd Renneberg, Lake Tapps, WA (US)

(73) Assignee: Ossia Inc., Redmond, WA (US)

( * ) Notice: Subject to any disclaimer, the term of this patent is extended or adjusted under 35 U.S.C. 154(b) by 342 days.

(21) Appl. No.: 15/942,747

(22) Filed: Apr. 2, 2018

(65) Prior Publication Data

US 2018/0287417 A1 Oct. 4, 2018

Related U.S. Application Data

(60) Provisional application No. 62/480,063, filed on Mar. 31, 2017.

(51) Int. Cl.
| | | |
|---|---|---|
| *H02J 7/00* | (2006.01) | |
| *H02J 7/02* | (2016.01) | |
| *H02J 50/20* | (2016.01) | |
| *H02J 50/80* | (2016.01) | |
| *H02J 7/04* | (2006.01) | |
| *H02J 50/40* | (2016.01) | |

(52) U.S. Cl.
CPC ............ *H02J 7/025* (2013.01); *H02J 7/0013* (2013.01); *H02J 7/045* (2013.01); *H02J 50/20* (2016.02); *H02J 50/40* (2016.02); *H02J 50/80* (2016.02)

(58) Field of Classification Search
USPC ....................................................... 320/108
See application file for complete search history.

(56) References Cited

U.S. PATENT DOCUMENTS

| | | | |
|---|---|---|---|
| 5,982,103 A | 11/1999 | Mosebrook et al. | |
| 6,178,140 B1 | 1/2001 | Schlieter | |
| 6,208,115 B1 | 3/2001 | Binder | |
| 6,316,915 B1 | 11/2001 | Fujiwara et al. | |
| 6,448,490 B1 | 9/2002 | Katz | |

(Continued)

FOREIGN PATENT DOCUMENTS

| | | |
|---|---|---|
| CN | 101401312 A | 4/2009 |
| CN | 101598264 A | 12/2009 |

(Continued)

OTHER PUBLICATIONS

European Patent Application No. 16777118.7, Extended European Search Report, 8 pages, dated Oct. 24, 2018.

(Continued)

*Primary Examiner* — Samuel Berhanu

(57) ABSTRACT

Embodiments of the present disclosure describe systems, methods, and apparatuses that actively regulate output voltage of wirelessly chargeable energy storage devices, e.g., wirelessly chargeable batteries. More specifically, techniques are described to emulate low-battery behavior of a standard battery, e.g., a typical AA battery, based on an internal state of the apparatus. The internal state can be determined based on commands provided by or to the apparatus or based on analog information such as, for example, an internal charge state, e.g., of a lithium-ion battery or capacitor.

21 Claims, 14 Drawing Sheets

(56) References Cited

U.S. PATENT DOCUMENTS

| | | |
|---|---|---|
| 6,647,483 B1 | 11/2003 | Hoglund et al. |
| 6,661,197 B2 | 12/2003 | Zink et al. |
| 7,042,196 B2 | 5/2006 | Ka-Lai et al. |
| 7,525,283 B2 | 4/2009 | Cheng et al. |
| 8,010,205 B2 | 8/2011 | Rahman et al. |
| 8,072,380 B2 | 12/2011 | Crouch |
| 8,310,201 B1 | 11/2012 | Wright |
| 8,460,816 B2 | 6/2013 | Julstrom et al. |
| 8,587,154 B2 | 11/2013 | Fells et al. |
| 8,853,891 B2 | 10/2014 | Soar |
| 8,896,315 B1 | 11/2014 | Davies |
| 9,452,296 B2 | 9/2016 | Forsell |
| 9,774,210 B1 | 9/2017 | Wright |
| 10,559,971 B2 | 2/2020 | Zeine et al. |
| 2002/0080083 A1 | 6/2002 | Nantz et al. |
| 2003/0027036 A1 | 2/2003 | Emori et al. |
| 2003/0153266 A1 | 8/2003 | Kim et al. |
| 2003/0220092 A1 | 11/2003 | Hethuin et al. |
| 2005/0136845 A1 | 6/2005 | Masuoka et al. |
| 2005/0275983 A1 | 12/2005 | Franklin et al. |
| 2006/0192532 A1* | 8/2006 | Oba ............... H03M 1/002 320/128 |
| 2007/0008132 A1 | 1/2007 | Bellantoni |
| 2007/0222415 A1* | 9/2007 | Shah ............... H02J 9/061 320/107 |
| 2007/0222681 A1 | 9/2007 | Greene et al. |
| 2008/0058029 A1 | 3/2008 | Sato et al. |
| 2008/0217309 A1 | 9/2008 | Rodgers |
| 2009/0096422 A1* | 4/2009 | Trattler ............... H02J 7/00 320/138 |
| 2010/0041349 A1 | 2/2010 | Mahany et al. |
| 2010/0141214 A1 | 6/2010 | Yoon et al. |
| 2010/0178919 A1 | 7/2010 | Deepak et al. |
| 2010/0181962 A1 | 7/2010 | Chen et al. |
| 2010/0259401 A1 | 10/2010 | Azancot et al. |
| 2010/0328073 A1 | 12/2010 | Nikitin et al. |
| 2011/0086256 A1 | 4/2011 | Julstrom et al. |
| 2011/0103517 A1 | 5/2011 | Hamalainen |
| 2011/0228436 A1 | 9/2011 | Lee et al. |
| 2012/0001644 A1 | 1/2012 | Baarman et al. |
| 2012/0153740 A1 | 6/2012 | Soar |
| 2012/0187851 A1 | 7/2012 | Huggins et al. |
| 2012/0262004 A1 | 10/2012 | Cook et al. |
| 2012/0274154 A1 | 11/2012 | DeLuca |
| 2012/0276854 A1 | 11/2012 | Joshi et al. |
| 2012/0302297 A1 | 11/2012 | Patel et al. |
| 2013/0026981 A1 | 1/2013 | Van Der Lee |
| 2013/0106661 A1 | 5/2013 | Xiang |
| 2013/0154892 A1 | 6/2013 | Zeltser et al. |
| 2013/0175982 A1 | 7/2013 | Teggatz et al. |
| 2013/0273870 A1 | 10/2013 | Shi |
| 2014/0002012 A1 | 1/2014 | McCauley et al. |
| 2014/0091626 A1 | 4/2014 | Walley et al. |
| 2014/0091636 A1 | 4/2014 | Ofstein et al. |
| 2014/0091756 A1 | 4/2014 | Ofstein et al. |
| 2014/0117928 A1 | 5/2014 | Liao |
| 2014/0217967 A1 | 8/2014 | Zeine et al. |
| 2014/0232330 A1 | 8/2014 | Robertson et al. |
| 2014/0252869 A1 | 9/2014 | Kamiura et al. |
| 2014/0266103 A1* | 9/2014 | Wang ............... G05F 1/462 323/274 |
| 2014/0268519 A1 | 9/2014 | Huang et al. |
| 2014/0302869 A1 | 10/2014 | Rosenbaum et al. |
| 2014/0361735 A1 | 12/2014 | Li et al. |
| 2015/0001949 A1 | 1/2015 | Leabman et al. |
| 2015/0022022 A1 | 1/2015 | Zeine |
| 2015/0048785 A1* | 2/2015 | Roohparvar ............ H01M 6/50 320/107 |
| 2015/0102764 A1 | 4/2015 | Leabman et al. |
| 2015/0102769 A1 | 4/2015 | Leabman et al. |
| 2015/0162763 A1* | 6/2015 | Kimura ............... H02J 7/0031 320/107 |
| 2015/0222129 A1 | 8/2015 | McCauley et al. |
| 2015/0365003 A1 | 12/2015 | Sadwick |
| 2016/0062376 A1* | 3/2016 | Kim ............... G05F 1/575 323/280 |
| 2016/0301259 A1 | 10/2016 | Zeine et al. |
| 2017/0141621 A1 | 5/2017 | Zeine et al. |
| 2017/0179771 A1 | 6/2017 | Leabman |
| 2017/0187249 A1 | 6/2017 | Zeine et al. |

FOREIGN PATENT DOCUMENTS

| | | |
|---|---|---|
| CN | 201877893 U | 6/2011 |
| EP | 2363906 A1 | 9/2011 |
| JP | 10-295043 A | 11/1998 |
| JP | 2004-102898 A | 4/2004 |
| JP | 2008-235022 A | 10/2008 |
| JP | 2013-38967 A | 2/2013 |
| KR | 2011-0135507 A | 12/2011 |
| KR | 10-1499770 B1 | 3/2015 |
| WO | 2013/142720 A1 | 9/2013 |
| WO | 2014/055658 A2 | 4/2014 |

OTHER PUBLICATIONS

Japanese Patent Application No. 2017-552036, Office Action, 12 pages, dated Oct. 30, 2018.

Japanese Patent Application No. 2017-552036, Office Action, 6 pages, dated Nov. 26, 2019.

Korean Patent Application No. 2017-7032541, Office Action, 16 pages, dated Dec. 3, 2019.

Chinese Patent Application No. 201680032910.5, Office Action, 9 pages, dated Jun. 19, 2020.

* cited by examiner

ACTIVELY MODIFYING OUTPUT VOLTAGE OF A WIRELESSLY CHARGEABLE ENERGY STORAGE APPARATUS

CROSS-REFERENCE TO RELATED APPLICATION

This application claims priority to and benefit from U.S. Provisional Patent Application No. 62/480,063 titled "Method of Modifying Output Voltage to Indicate State" filed on Mar. 31, 2017, the contents of which are expressly incorporated by reference herein. This application is related to U.S. patent application Ser. No. 15/048,982 titled "WIRELESSLY CHARGEABLE BATTERY APPARATUS" filed on Feb. 19, 2016, the contents of which are expressly incorporated by reference herein.

BACKGROUND

The use of rechargeable and non-rechargeable batteries in electronic devices is ubiquitous. Rechargeable batteries are typically recharged through the use of battery chargers which plug into a port on the electronic device and to an electrical outlet to facilitate the transfer of electrical power. Alternatively, an electronic device can be powered using removable (rechargeable or non-rechargeable) batteries. Unfortunately, when an electronic device is charging or when batteries are charging, the device essentially becomes tethered to the wall and its portability aspect is lost for the duration of time the battery is recharged.

Wireless charging functionality can be added to devices through the use of various wireless power receiver components, such as those made and designed by Ossia Inc. Unfortunately, it is time consuming, difficult and expensive to integrate enhancements, such as adding wireless charging functionality, into existing wireless devices as the enhancements can require extensive internal and/or external redesign.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
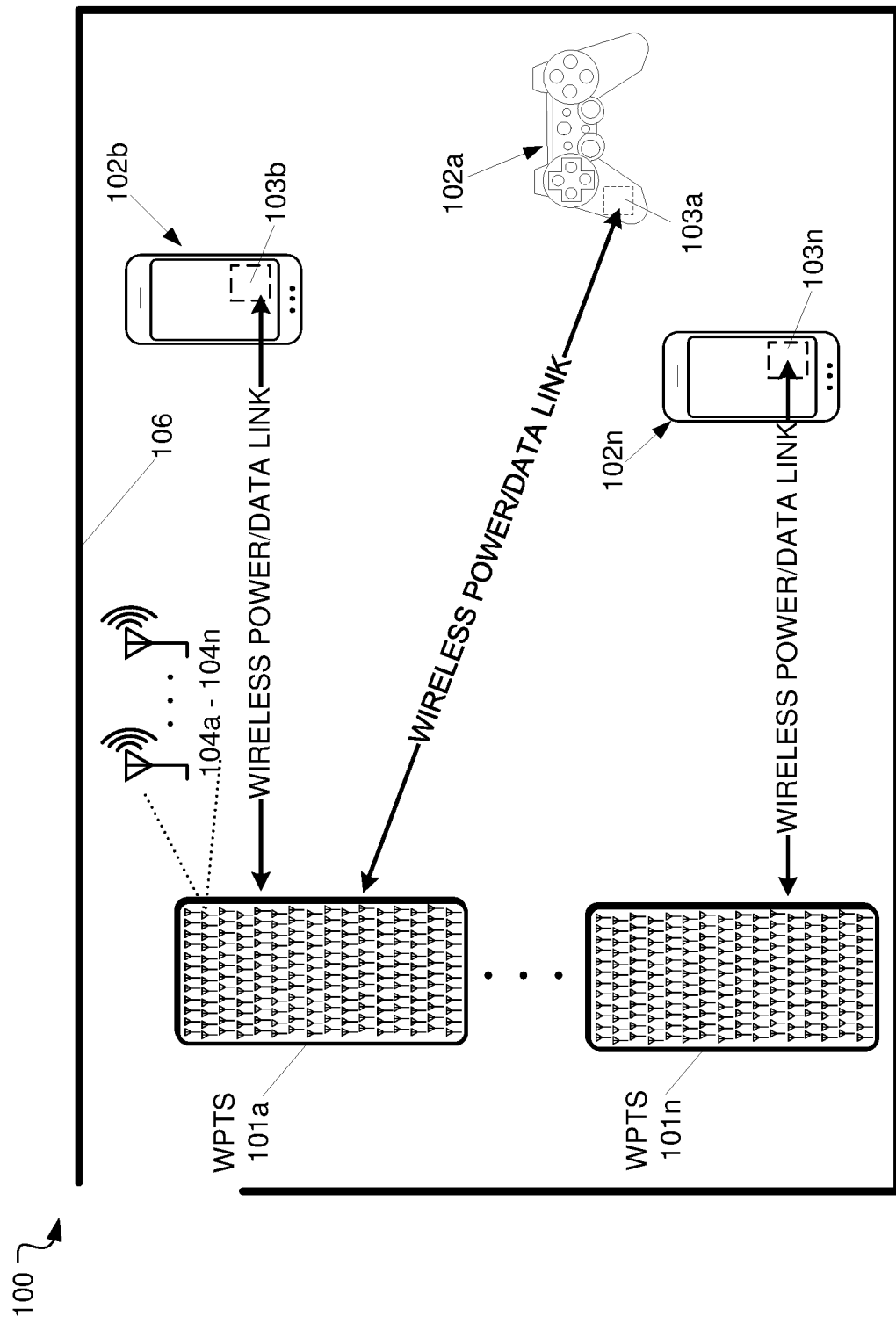
FIG. 1 depicts a block diagram including an example wireless power delivery environment illustrating wireless power delivery from one or more wireless power transmission systems to various wireless devices within the wireless power delivery environment in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

A typical battery, e.g., AA-type battery, has an output voltage that varies around the nominal voltage depending on a charge level or state of the battery and a load applied to the battery. Some battery-powered devices use the nominal voltage to identify a low-battery state. For example, a smoke detector may beep when a charge level of a battery falls below a threshold value. As noted above, wireless charging functionality can be added to electronic devices by integrating the devices with various wireless power receiver components, such as those made and designed by Ossia Inc. Alternatively, these components can be integrated and/or otherwise included within standard form factor (or customized form factor) batteries. For example, a wireless power receiver enabled battery, e.g., Cota® AA battery, includes various wireless power receiver components for receiving, processing and storing wireless power.

Unfortunately, wireless power enabled batteries exhibit different behaviors than typical batteries. For example, current wireless power enabled batteries do not have output voltages that vary around the nominal voltage depending on the charge level.

Embodiments of the present disclosure describe systems, methods, and apparatuses that actively regulate output voltage of wirelessly chargeable energy storage devices, e.g., wirelessly chargeable batteries. More specifically, techniques are described to emulate low-battery behavior of a standard battery, e.g., a typical AA battery, based on an internal state of the apparatus. The internal state can be determined based on commands provided by or to the apparatus or based on analog information such as, for example, an internal charge state, e.g., of a lithium-ion battery or capacitor.

In some embodiments, a wirelessly chargeable energy storage apparatus can digitally control the output voltage using a Digital-to-Analog converter (DAC) or similar technique to alter the output power supply feedback to adjust the output voltage. Alternatively, the wirelessly chargeable energy storage apparatus can drive the output power supply feedback using an analog technique. Advantageously, actively regulating the output voltage allows the wirelessly chargeable energy storage apparatus to retrofit wireless power receiving capability into any existing electronic device that accepts a standard (or non-standard) form factor battery. Additional functionality for intentionally adjusting and/or actively controlling the output voltage is also described herein.

The embodiments described herein are primarily discussed with reference to standardized AA or AAA battery form factors. However, it is appreciated that wireless battery apparatuses are configurable in any battery form factor (including custom or semi-custom battery form factors) and can be used by any device that requires a rechargeable or non-rechargeable battery.

FIG. 1 depicts a block diagram including an example wireless power delivery environment 100 illustrating wireless power delivery from one or more wireless power transmission systems (WPTS) 101*a-n* (also referred to as "wireless power delivery systems", "antenna array systems" and "wireless chargers") to various wireless devices 102*a-n* within the wireless power delivery environment 100, according to some embodiments. More specifically, FIG. 1 illustrates an example wireless power delivery environment 100 in which wireless power and/or data can be delivered to available wireless devices 102*a*-102*n* having one or more wireless power receiver clients 103*a*-103*n* (also referred to herein as "clients" and "wireless power receivers"). The wireless power receiver clients are configured to receive and process wireless power from one or more wireless power transmission systems 101*a*-101*n*. Components of an example wireless power receiver client 103 are shown and discussed in greater detail with reference to FIG. 4.

As shown in the example of FIG. 1, the wireless devices 102*a*-102*n* include mobile phone devices and a wireless game controller. However, the wireless devices 102*a*-102*n* can be any device or system that needs power and is capable of receiving wireless power via one or more integrated wireless power receiver clients 103*a*-103*n*. As discussed herein, the one or more integrated wireless power receiver clients receive and process power from one or more wireless power transmission systems 101*a*-101*n* and provide the power to the wireless devices 102*a*-102*n* (or internal batteries of the wireless devices) for operation thereof.

Each wireless power transmission system 101 can include multiple antennas 104*a-n*, e.g., an antenna array including hundreds or thousands of antennas, which are capable of delivering wireless power to wireless devices 102*a*-102*n*. In some embodiments, the antennas are adaptively-phased RF antennas. The wireless power transmission system 101 is capable of determining the appropriate phases with which to deliver a coherent power transmission signal to the wireless power receiver clients 103*a*-103*n*. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more wireless power receiver clients 103. As illustrated in the example of FIG. 1, power delivery antennas 104*a*-104*n* are shown. The power delivery antennas 104*a* are configured to provide delivery of wireless radio frequency power in the wireless power delivery environment. In some embodiments, one or more of the power delivery antennas 104a-104n can alternatively or additionally be configured for data communications in addition to or in lieu of wireless power delivery. The one or more data communication antennas are configured to send data communications to and receive data communications from the wireless power receiver clients 103a-103n and/or the wireless devices 102a-102n. In some embodiments, the data communication antennas can communicate via Bluetooth™, Wi-Fi™, ZigBee™, etc. Other data communication protocols are also possible.

Each wireless power receiver client 103a-103n includes one or more antennas (not shown) for receiving signals from the wireless power transmission systems 101a-101n. Likewise, each wireless power transmission system 101a-101n includes an antenna array having one or more antennas and/or sets of antennas capable of emitting continuous wave or discrete (pulse) signals at specific phases relative to each other. As discussed above, each of the wireless power transmission systems 101a-101n is capable of determining the appropriate phases for delivering the coherent signals to the wireless power receiver clients 102a-102n. For example, in some embodiments, coherent signals can be determined by computing the complex conjugate of a received beacon (or calibration) signal at each antenna of the array such that the coherent signal is phased for delivering power to the particular wireless power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101a-101n can be connected to a power source such as, for example, a power outlet or source connecting the wireless power transmission systems to a standard or primary AC power supply in a building. Alternatively, or additionally, one or more of the wireless power transmission systems 101a-101n can be powered by a battery or via other mechanisms, e.g., solar cells, etc.

The wireless power receiver clients 102a-102n and/or the wireless power transmission systems 101a-101n are configured to operate in a multipath wireless power delivery environment. That is, the wireless power receiver clients 102a-102n and the wireless power transmission systems 101a-101n are configured to utilize reflective objects 106 such as, for example, walls or other RF reflective obstructions within range to transmit beacon (or calibration) signals and/or receive wireless power and/or data within the wireless power delivery environment. The reflective objects 106 can be utilized for multi-directional signal communication regardless of whether a blocking object is in the line of sight between the wireless power transmission system and the wireless power receiver clients 103a-103n.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the wireless power receiver clients 103a-103n can each include a data communication module for communication via a data channel. Alternatively, or additionally, the wireless power receiver clients 103a-103n can direct the wireless devices 102a-102n to communicate with the wireless power transmission system via existing data communications modules. In some embodiments, the beacon signal, which is primarily referred to herein as a continuous waveform, can alternatively or additionally take the form of a modulated signal.

Figure 2:
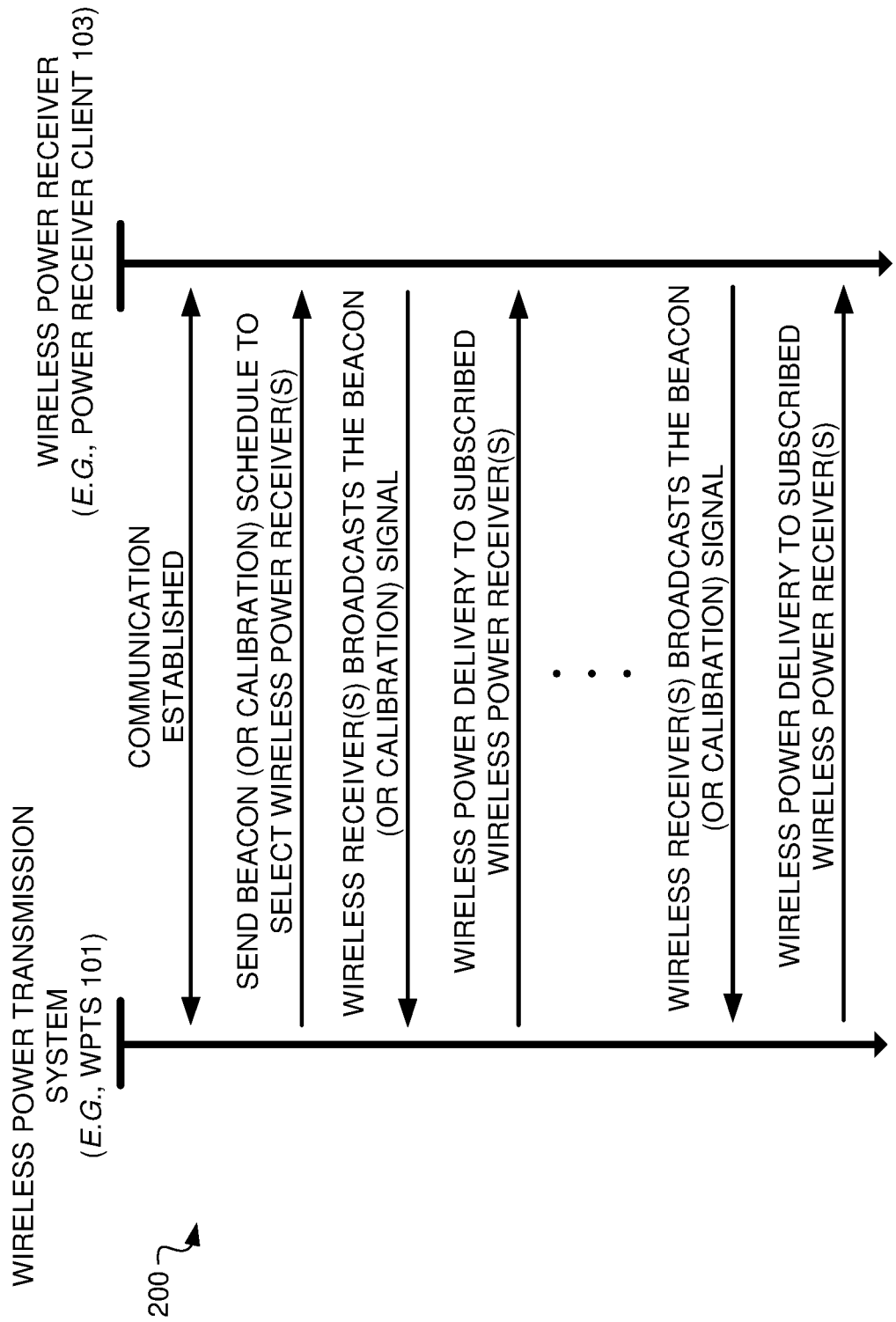
FIG. 2 depicts a sequence diagram illustrating example operations between a wireless power transmission system and a wireless receiver client for commencing wireless power delivery in accordance with some embodiments.

FIG. 2 depicts a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select wireless power receiver clients 103. The wireless power transmission system 101 can also send power transmission scheduling information so that the wireless power receiver client 103 knows when to expect (e.g., a window of time) wireless power from the wireless power transmission system. The wireless power receiver client 103 then generates a beacon (or calibration) signal and broadcasts the beacon during an assigned beacon transmission window (or time slice) indicated by the beacon schedule information, e.g., BBS cycle. As discussed herein, the wireless power receiver client 103 includes one or more antennas (or transceivers) which have a radiation and reception pattern in three-dimensional space proximate to the wireless device 102 in which the wireless power receiver client 103 is embedded.

The wireless power transmission system 101 receives the beacon from the power receiver client 103 and detects and/or otherwise measures the phase (or direction) from which the beacon signal is received at multiple antennas.

The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the wireless power receiver client 103 via the same path over which the beacon signal was received from the wireless power receiver client 103.

In some embodiments, the wireless power transmission system 101 includes many antennas. One or more of the many antennas may be used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from one or more antennas in such a way as to create an aggregate signal from the one or more of the antennas that approximately recreates the waveform of the beacon in the opposite direction. Said another way, the wireless power transmission system 101 can deliver wireless RF power to the wireless power receiver clients via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by wireless power receiver clients 103 within the power delivery environment according to, for example, the BBS, so that the wireless power transmission system 101 can maintain knowledge and/or otherwise track the location of the power receiver clients 103 in the wireless power delivery environment. The process of receiving beacon signals from a wireless power receiver client 103 at the wireless power transmission system and, in turn, responding with wireless power directed to that particular wireless power receiver client is referred to herein as retrodirective wireless power delivery.

Furthermore, as discussed herein, wireless power can be delivered in power cycles defined by power schedule information. A more detailed example of the signaling required to commence wireless power delivery is described now with reference to FIG. 3.

Figure 3:
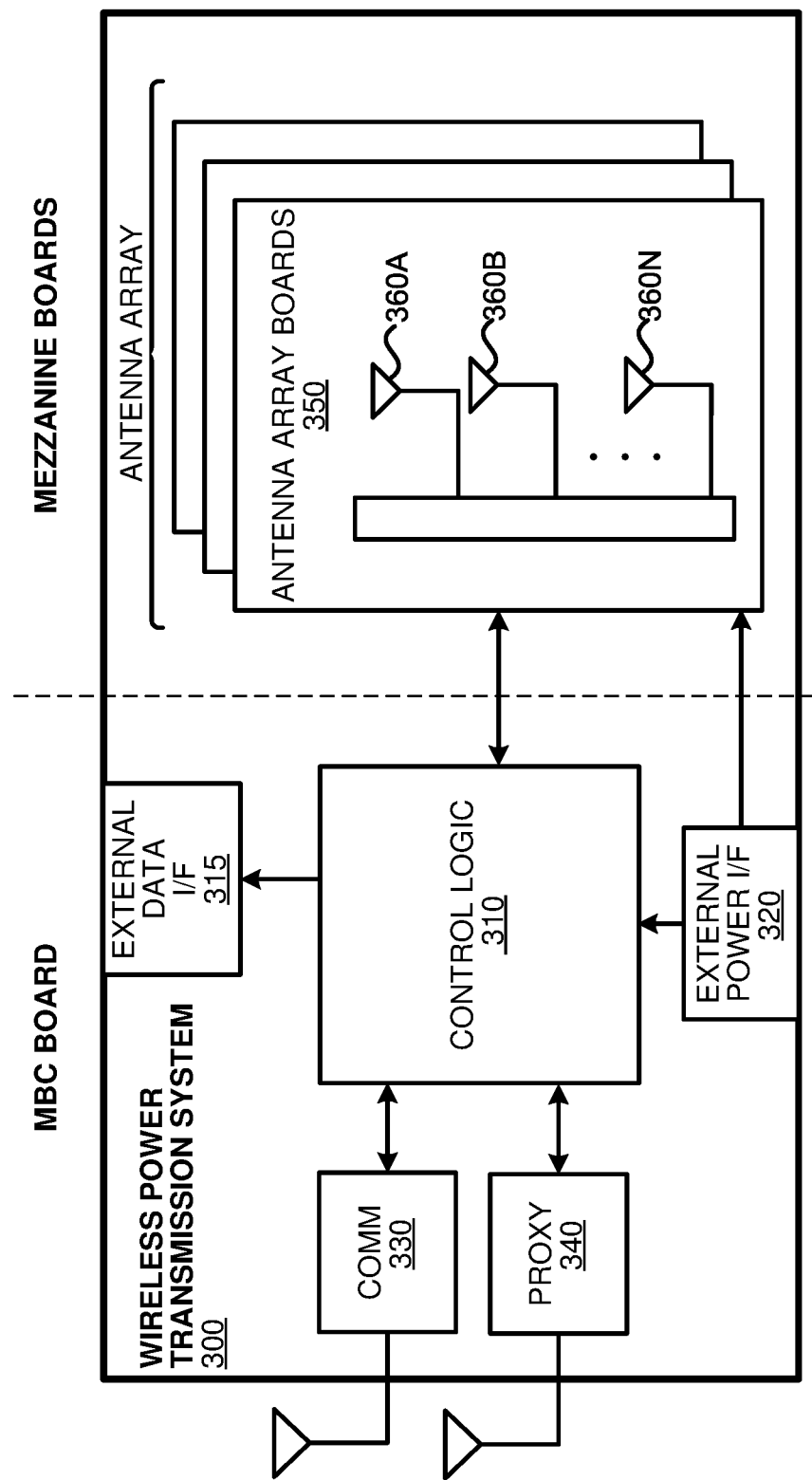
FIG. 3 depicts a block diagram illustrating example components of a wireless power transmission system in accordance with some embodiments.

FIG. 3 depicts a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible. For example, in some embodiments only one of communication block 330 or proxy 340 may be included.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth™, Wi-Fi™, ZigBee™, etc., including combinations or variations thereof. Likewise, the proxy 340 can communicate with clients via data communications as discussed herein. The data communications can be, by way of example and not limitation, Bluetooth™, Wi-Fi™, ZigBee™, etc. Other communication protocols are possible.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoT devices. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. In other embodiments, the external power interface 320 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, the MBC, which controls the wireless power transmission system 300, receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a BBS cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy Antenna Element (AE) broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy AE can concurrently query the Client Query Table to check the status of other available clients. In some embodiments, a client can only exist in the BBS or the CQT (e.g., waitlist), but not in both. The information collected in the previous step continuously and/or periodically updates the BBS cycle and/or the PS.

Figure 4:
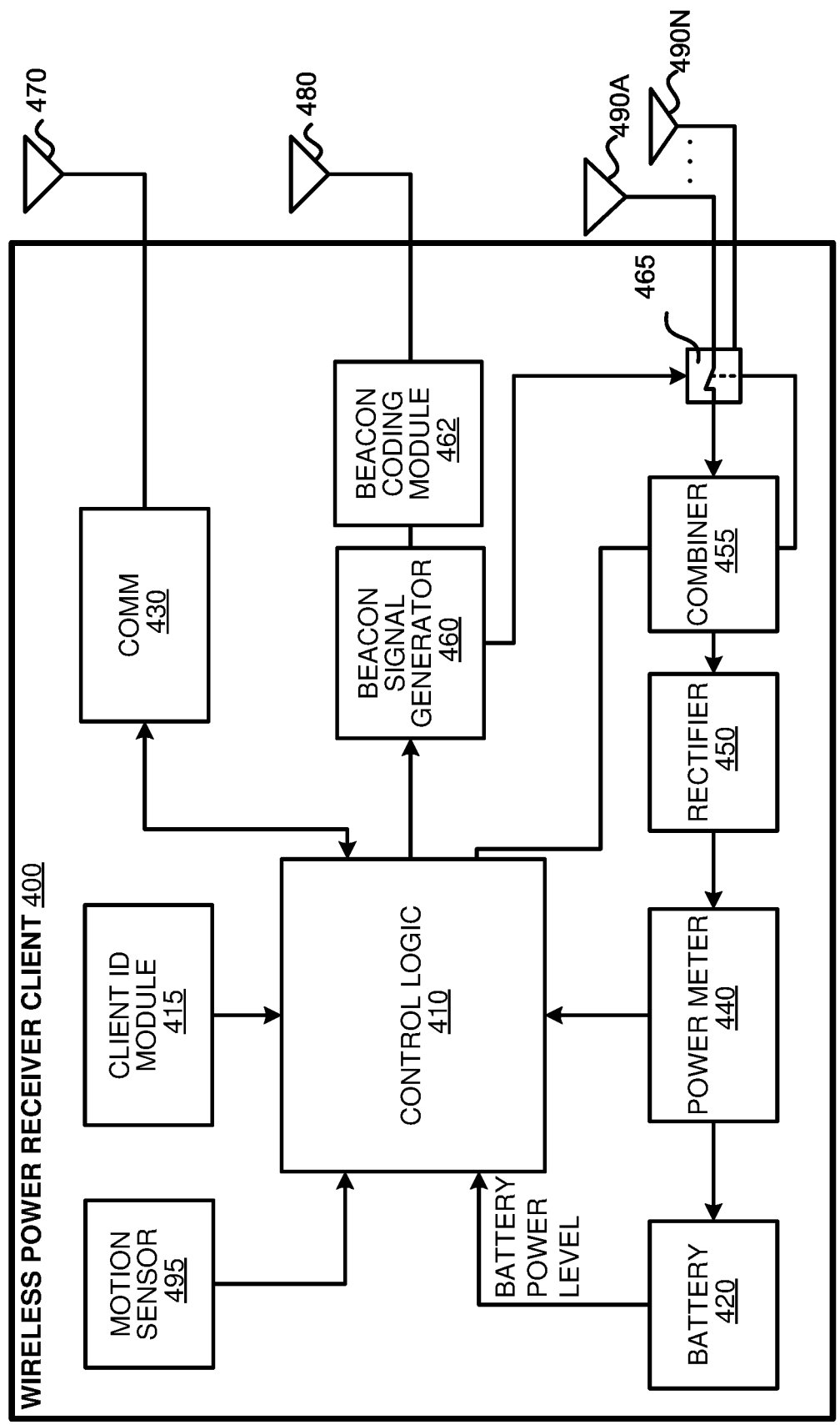
FIG. 4 depicts a block diagram illustrating example components of a wireless power receiver client in accordance with some embodiments.

FIG. 4 is a block diagram illustrating example components of a wireless power receiver client 400, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client 400 does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. In other embodiments, each antenna's power path can have its own rectifier 450 and the DC power out of the rectifiers is combined prior to feeding the power meter 440. The power meter 440 can measure the received power signal strength and provides the control logic 410 with this measurement.

Battery 420 can include protection circuitry and/or monitoring functions. Additionally, the battery 420 can include one or more features, including, but not limited to, current limiting, temperature protection, over/under voltage alerts and protection, and coulomb monitoring.

The control logic 410 receives and processes the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown as charged by, and providing power to, the wireless power receiver client 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client 400 is embedded, usage information of the device in which the wireless power receiver client 400 is embedded, power levels of the battery or batteries of the device in which the wireless power receiver client 400 is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the wireless power receiver client 400 in a wireless power delivery environment. For example, the ID can be transmitted to one or more wireless power transmission systems when communication is established. In some embodiments, wireless power receiver clients may also be able to receive and identify other wireless power receiver clients in a wireless power delivery environment based on the client ID.

An optional motion sensor 495 can detect motion and signal the control logic 410 to act accordingly. For example, a device receiving power may integrate motion detection mechanisms such as accelerometers or equivalent mechanisms to detect motion. Once the device detects that it is in motion, it may be assumed that it is being handled by a user, and would trigger a signal to the array to either to stop transmitting power, or to lower the power transmitted to the device. In some embodiments, when a device is used in a moving environment like a car, train or plane, the power might only be transmitted intermittently or at a reduced level unless the device is critically low on power.

Figure 5A:
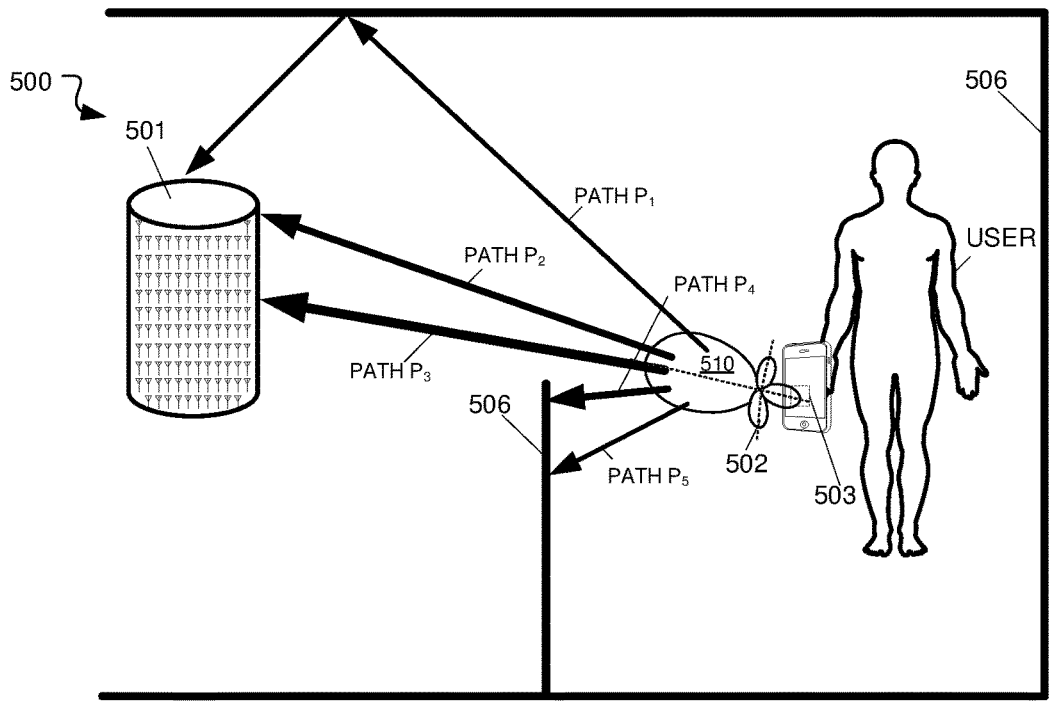
FIGS. 5A and 5B depict diagrams illustrating an example multipath wireless power delivery environment in accordance with some embodiments.
Figure 5B:
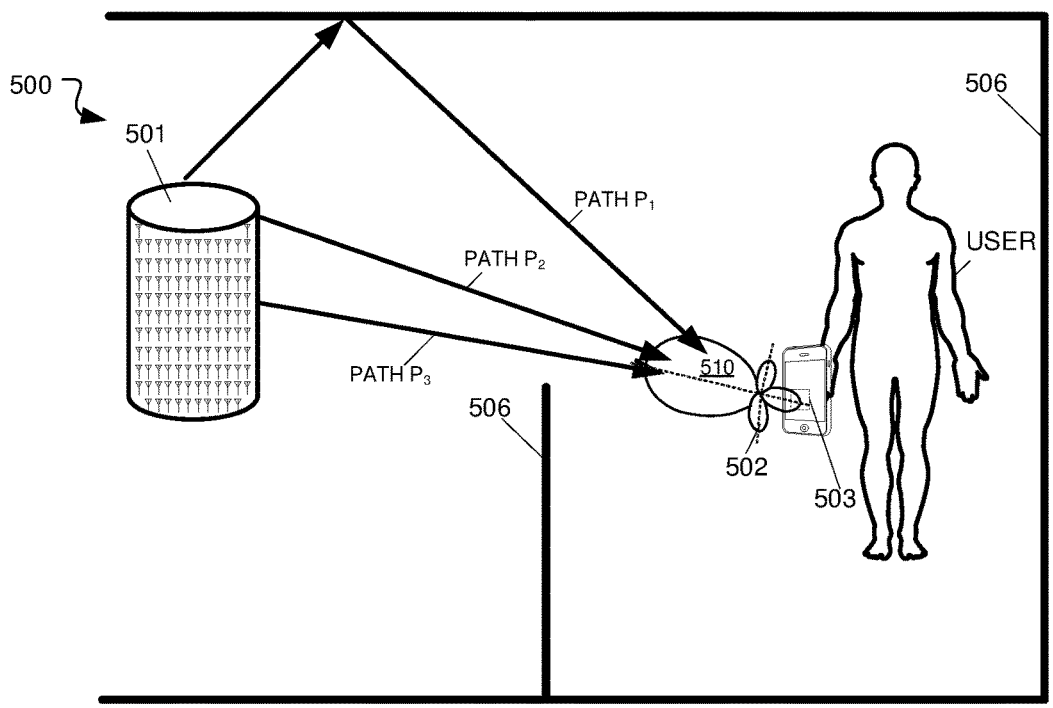

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 of FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 502. The one or more antennas (or transceivers) can be wholly or partially included as part of the wireless device 502 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., received signal strength indication (RSSI), depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments, the beacon signals are directionally transmitted in this manner, for example, to avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetism. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receive power, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment. Although the example of FIG. 5A illustrates transmitting a beacon (or calibration) signal in the direction of the radiation and reception pattern 510, it is appreciated that, in some embodiments, beacon signals can alternatively or additionally be omni-directionally transmitted.

Figure 6:
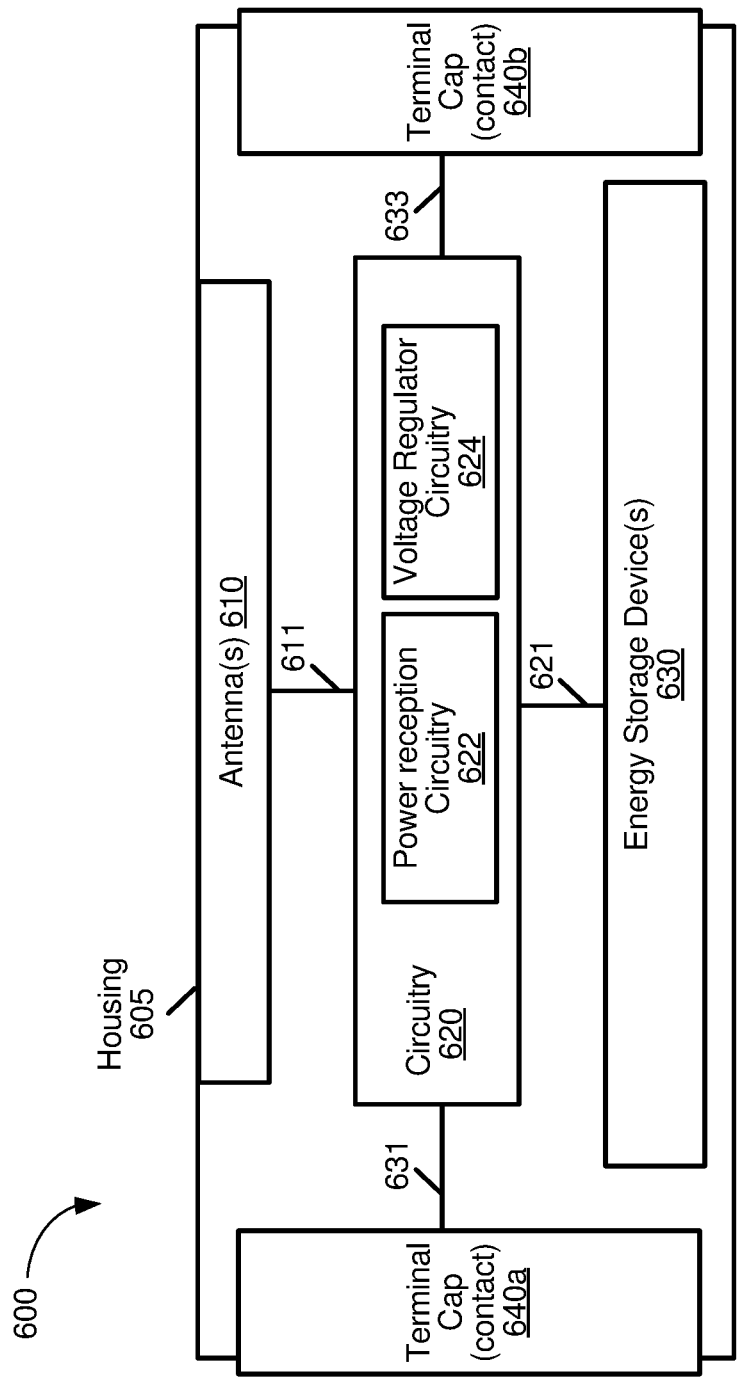
FIG. 6 depicts a block diagram illustrating example components of a wirelessly chargeable energy storage apparatus, according to some embodiments.

FIG. 6 depicts a block diagram illustrating example components of a wirelessly chargeable energy storage device 600, according to some embodiments. As shown in the example of FIG. 6, the wirelessly chargeable energy storage apparatus 600 includes a housing 605, one or more antennas 610, circuitry 620, one or more energy storage device(s) 630, and terminals caps (or contacts) 640a and 640b. The circuitry 620 includes power reception circuitry 622 and voltage regulator circuitry 624. As shown in the example of FIG. 6, the one or more antennas 610 are connected to the circuitry 620 via a connection 611 and the circuitry 620 is connected to the one or more energy storage devices 630 via a connection 621. The connections 611, 621, 631 and 633 may be traces on a printed circuit board, physical wires, or any other mechanism.

The housing 605 is configured in dimensions that conform to standardized battery dimensions. Accordingly, the wirelessly chargeable energy storage apparatus 600 is retrofittable into existing electronic devices without redesign of those electronic devices. As discussed herein, the electronic device can be any electronic device that is powered by batteries, e.g., game controllers, remote controls, alarm systems, etc. The batteries can be rechargeable or non-rechargeable. The electronic devices can also be devices with less standardized rechargeable batteries such as, for example, mobile phones, tablet computers, etc. Furthermore, the wirelessly chargeable energy storage apparatus 600 can include some or all of the components of a wireless power receiver client, the components of which are discussed in greater detail above.

The example of FIG. 6 includes terminal caps (or contacts) 640a and 640b. The housing 605 can be configured in cylindrical or non-cylindrical cell battery form factors, camera battery form factors, button cell battery form factors, etc. For example, the standard form factor can be, among other form factors, AA, AAA, C, D, 4.5-volt, 9-volt, Lantern (spring) battery form factors. Furthermore, in some embodiments, the standard form factor can be a form factor that is configured to power mobile devices, including, but not limited to, mobile phone batteries, tablet computer batteries, etc. Example wirelessly chargeable battery apparatuses are primarily shown and discussed in cylindrical form factor. However, as discussed herein, the wirelessly chargeable battery apparatuses are not limited to cylindrical form factors.

The one or more antennas 610 are configured to receive a wireless power signal from a wireless charging system, e.g., a wireless power delivery system or charger. As discussed herein, the wireless power signals can include alternating current (AC) power. The one or more antennas can be located within the housing on one or more printed circuit boards (PCBs), flexible PCBs, embedded on or within the interior surface of the housing 605, and/or embedded on or within the exterior surface of the housing 605 including combinations and/or variations thereof.

The power reception circuitry 622 can be configured to convert received wireless RF power to direct current (DC) power. For example, power reception circuitry 622 can include some or all of the components of a wireless power receiver such as, for example, wireless power receiver 400 of FIG. 4. For example, the power reception circuitry 622 and/or other components of the circuitry 620 can process the wireless power received via the one or more antennas 610 and convert received wireless RF Power to direct current (DC) power. In some embodiments, the RF Power is alternating current (AC) power. The power reception circuitry 622 can also, among other functions, detect status information of the one or more energy storage devices 630 and/or one or more internal states of the portable electronic device to which the housing is attached and control the charging of the one or more energy storage devices 630 based on this information. As discussed herein, the one or more energy storage devices 630 can store the DC power.

In some embodiments, other storage technology, capacitors, etc., can be used in lieu of or in addition to the one or more batteries. Alternatively, the wirelessly chargeable energy storage apparatus 600 may not include a battery but instead directly charge one or more batteries of a portable electronic device to which it is removably attached.

The wirelessly chargeable energy storage apparatus 600 includes terminal caps (or contacts) 640a and 640b over which power can be exchanged between the one or more energy storage device(s) 630 and/or circuitry 620 and the electronic device when wirelessly chargeable energy storage apparatus 600 is electrically coupled with the electronic device, e.g., placed in a battery recess of the electronic device.

As discussed herein, the techniques provide various benefits. For example, if a wireless power receiver enabled battery, e.g., Cota® AA battery, is installed in a smoke detector, and the power goes out—rending the wireless power receiver client inoperable—or dips below a threshold value, then the smoke detector can detect the low battery scenario and alert the user to replace the battery as in a typical AA battery use-case. Likewise, if the internal energy storage, e.g., energy storage devices 630, is low for a game controller, and the power load is greater than the available power supply, then the game controller can detect a low battery to alert the user or game prior to a gameplay interruption.

Various other reasons to adjust the output voltage of a wirelessly chargeable energy storage apparatus are also possible. For example, if a load is an adjustable (e.g., dimmable, multicolor, etc.) light bulb or light emitting diode (LED), the output voltage can be adjusted to change the brightness or color of the light bulb or LED. As discussed in greater detail below, the adjustment can be achieved using a DAC method described herein where the input data to the DAC is wirelessly controlled by an over-the-air communication method or technique.

Figure 7:
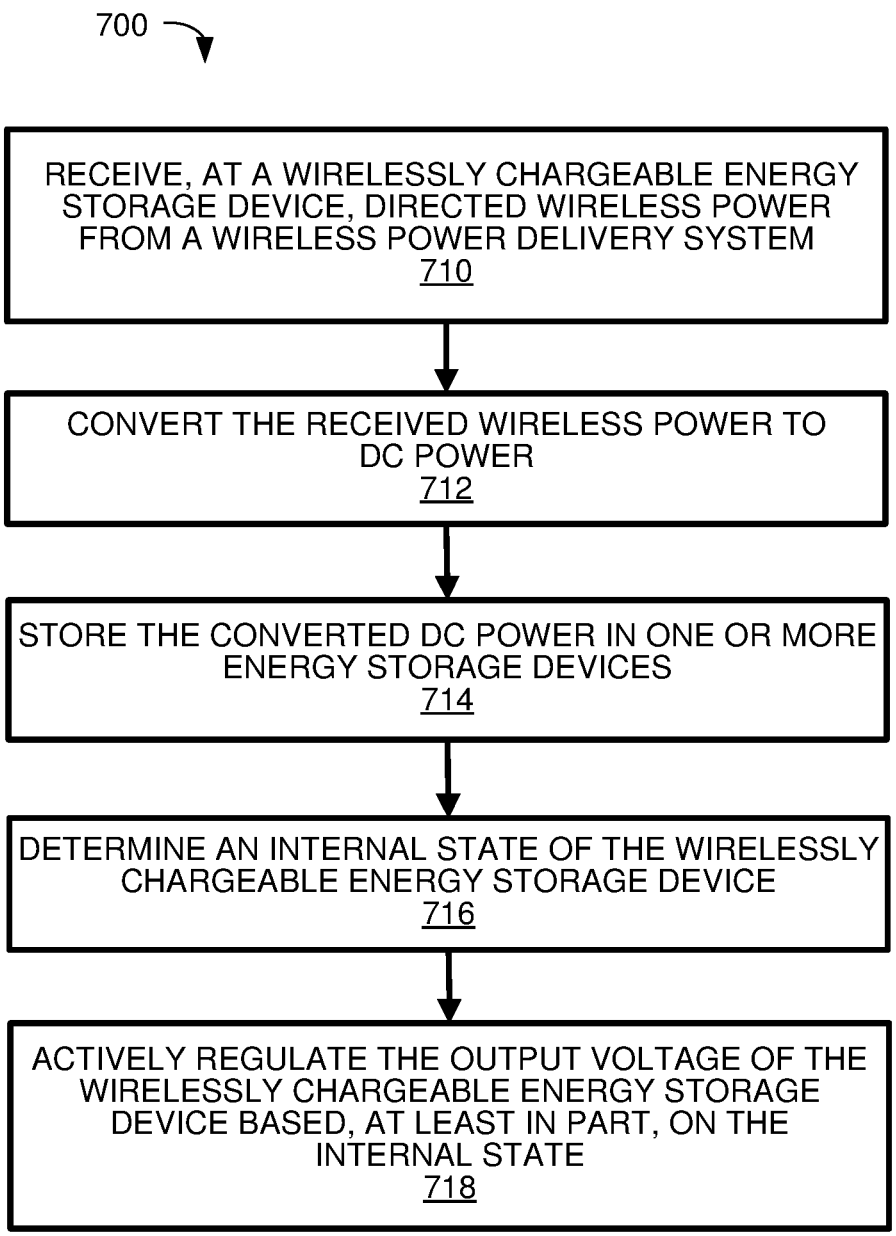
FIG. 7 depicts a flow diagram illustrating an example process for regulating output voltage of a wirelessly chargeable energy storage apparatus, according to some embodiments.

FIG. 7 depicts a flow diagram illustrating an example process 700 for regulating output voltage of a wirelessly chargeable energy storage apparatus, according to some embodiments. A wirelessly chargeable energy storage apparatus can, among other functions, perform the corresponding steps of example process 700. The wirelessly chargeable energy storage apparatus can be wirelessly chargeable energy storage apparatus 600 of FIG. 6, although alternative configurations are possible.

To begin, at step 710, the wirelessly chargeable battery apparatus receives directed wireless radio frequency (RF) power from a wireless power delivery system. At step 712, the wirelessly chargeable battery apparatus converts the received wireless RF power to direct current (DC) power. At step 714, the wirelessly chargeable battery apparatus stores the converted DC power in one or more energy storage devices. At step 716, the wirelessly chargeable battery apparatus determines an internal state of the wirelessly chargeable energy storage apparatus. Lastly at step 718, the wirelessly chargeable battery apparatus actively regulates the output voltage of the wirelessly chargeable energy storage apparatus based on the internal state.

Figure 8:
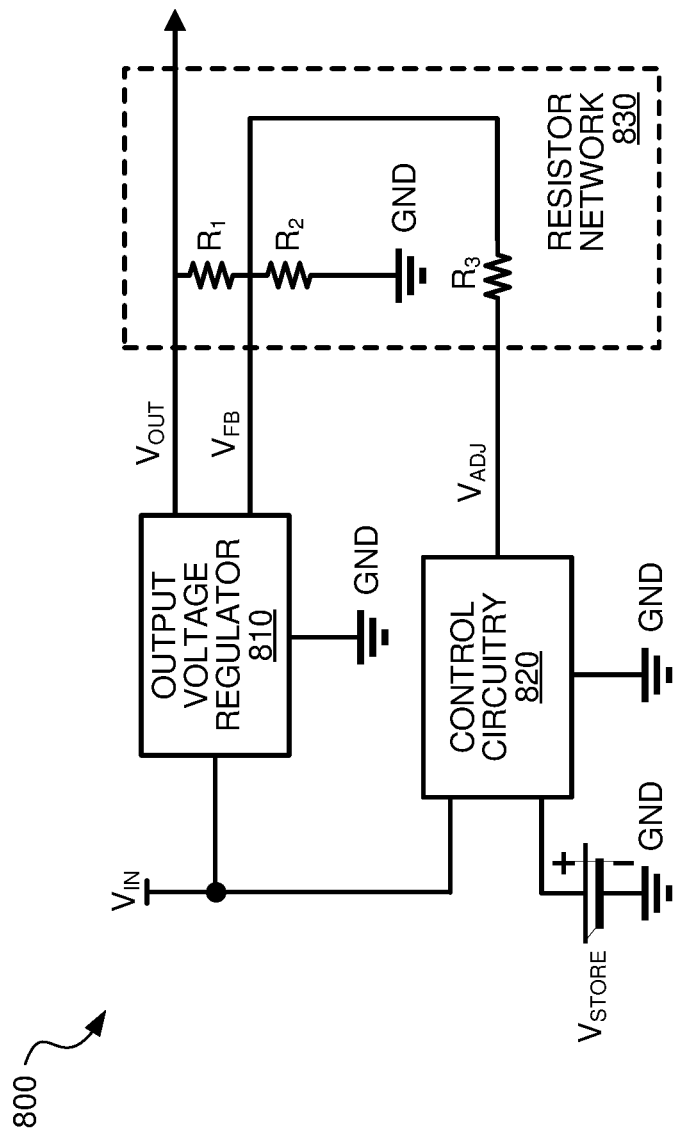
FIG. 8 depicts example voltage regulator circuitry, according to some embodiments.

FIG. 8 depicts example voltage regulator circuitry 800, according to some embodiments. The voltage regulator circuitry 800 can be voltage regulator circuitry 624 of FIG. 6, although alternative configurations are possible. As illustrated in the example of FIG. 8, the voltage regulator circuitry 800 includes an output voltage regulator 810, control circuitry 820, and a resistor network 830. A voltage store $V_{STORE}$ is also shown which may or may not be part of the voltage regulator circuitry 800. In some embodiments, the voltage store $V_{STORE}$ can be one or more energy storage devices such as, for example, energy storage device(s) 630 of FIG. 6. Other components are also possible.

The output voltage regulator 810 provides a stable DC voltage independent of load current, temperature or AC line voltage variations. The voltage regulator 810 may use a simple feed-forward design or may include negative feedback. The voltage regulator 810 may use an electromechanical mechanism or electronic components. The voltage regulator 810 can consist of one or more of the following components: a reference voltage circuit, an error amplifier, a series pass transistor and a feedback network.

The control circuitry 820 is configured to determine the internal state of the wirelessly chargeable energy storage apparatus. In some embodiments, the control circuitry 820 determines or monitors the internal state of the apparatus, e.g., a charge state of the one or more energy storage devices.

The resistor network 830 includes a three-resistor network for adjusting the output voltage ($V_{OUT}$) based on a power supply feedback voltage ($V_{FB}$) and an adjustment input voltage ($V_{ADJ}$). In some embodiments, the resistor values can be determined by setting $V_{ADJ}$ to zero and $V_{OUT}$ to the high voltage. $V_{FB}$, $R_1$, and the parallel combination of $R_2$ and $R_3$ can be set to achieve this result. To determine final values for $R_2$ and $R_3$, $V_{ADJ}$ can be set to the high voltage, and R2 and R3 can be set to produce the lowest desired $V_{OUT}$ voltage. In some embodiments, the three-resistor network adheres to the following equation:

$$0 = \frac{V_{ADJ} - V_{FB}}{R_3} + \frac{V_{OUT} - V_{FB}}{R_1} + \frac{0 - V_{FB}}{R_2}$$

Figure 9A:
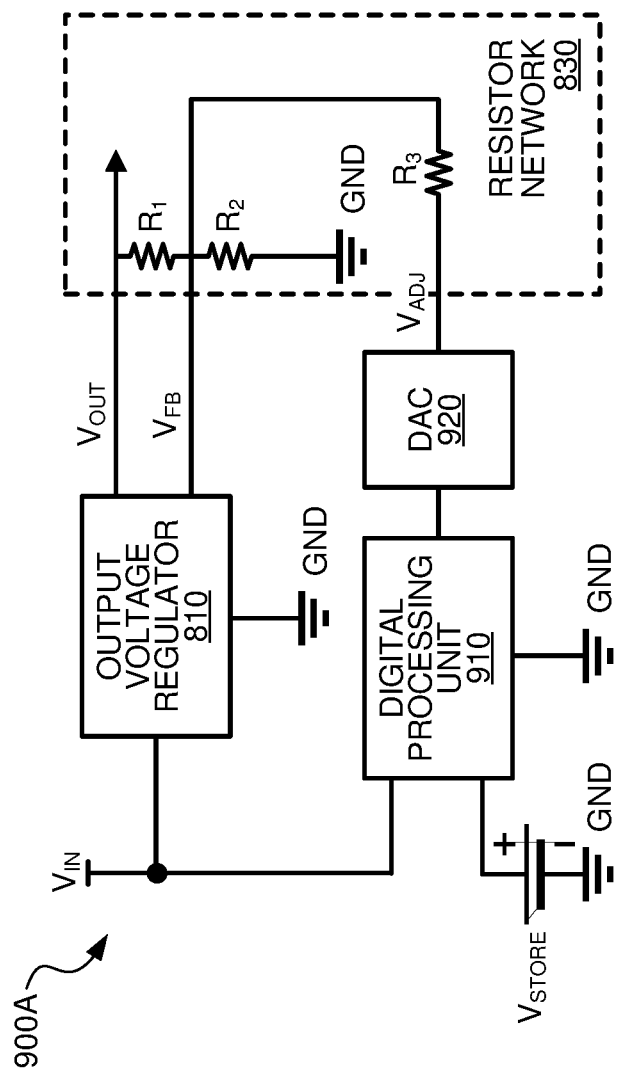
FIGS. 9A and 9B depict example voltage regulator circuitry, according to some embodiments.
Figure 9B:
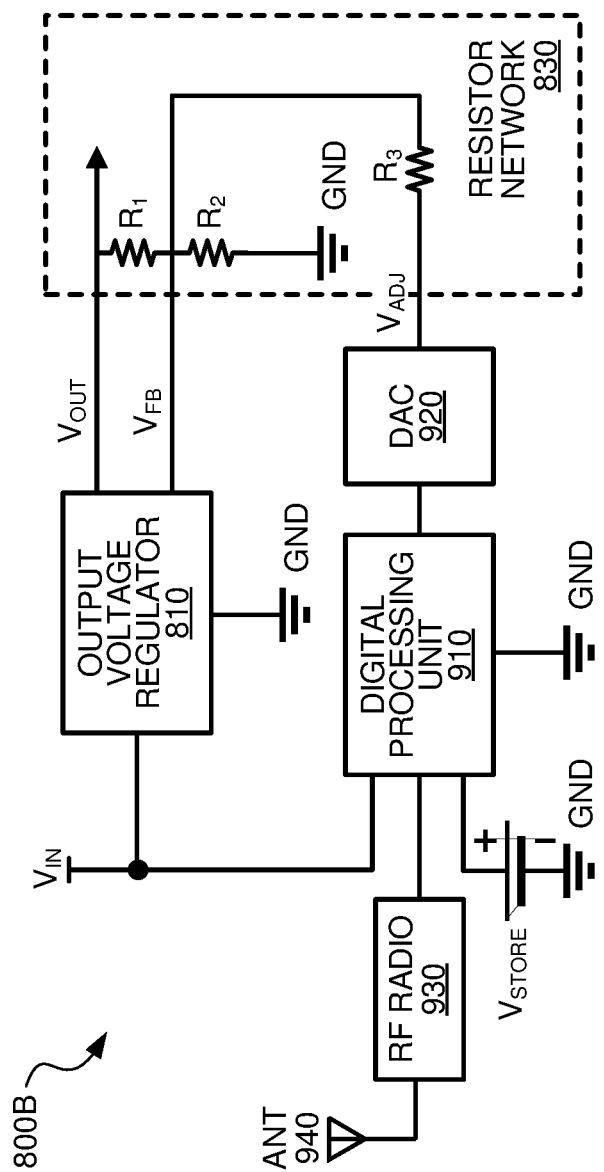

FIGS. 9A and 9B depict example voltage regulator circuitry 900A and 900B, respectively, according to some embodiments. More specifically, the voltage regulator circuitry 900A and 900B illustrate examples of digital voltage regulator control both with and without communication functionality.

As illustrated in the example of FIG. 9A, the voltage regulator circuitry 900A includes output voltage regulator 810, a digital processing unit 910, a digital to analog converter 920, and a resistor network 830. A voltage store $V_{STORE}$ is also shown which may or may not be part of the voltage regulator circuitry 900A. The example of FIG. 9B includes similar components to the example of FIG. 9A, but also includes an RF radio 930 and an antenna 940 configured to wirelessly receive instructions from a discrete electronic device, e.g., mobile phone or a remote computing system, for actively adjusting and/or otherwise controlling regulation of the output voltage of a wirelessly chargeable energy storage apparatus.

Referring again to the example of FIG. 9A, the digital processing unit 910 is configured to determine the internal state of the wirelessly chargeable energy storage apparatus. For example, the internal state can be a charge state of one or more energy storage devices. The digital processing unit 910 is electrically coupled with digital-to-analog converter (DAC) 920. As shown in the examples of FIGS. 9A and 9B, the DAC 920 receives a digital control signal from the digital processing unit 910 and converts the signal to an adjustment voltage ($V_{ADJ}$). As discussed herein, the adjustment voltage ($V_{ADJ}$) is an input to resistor network 830.

Figure 10:
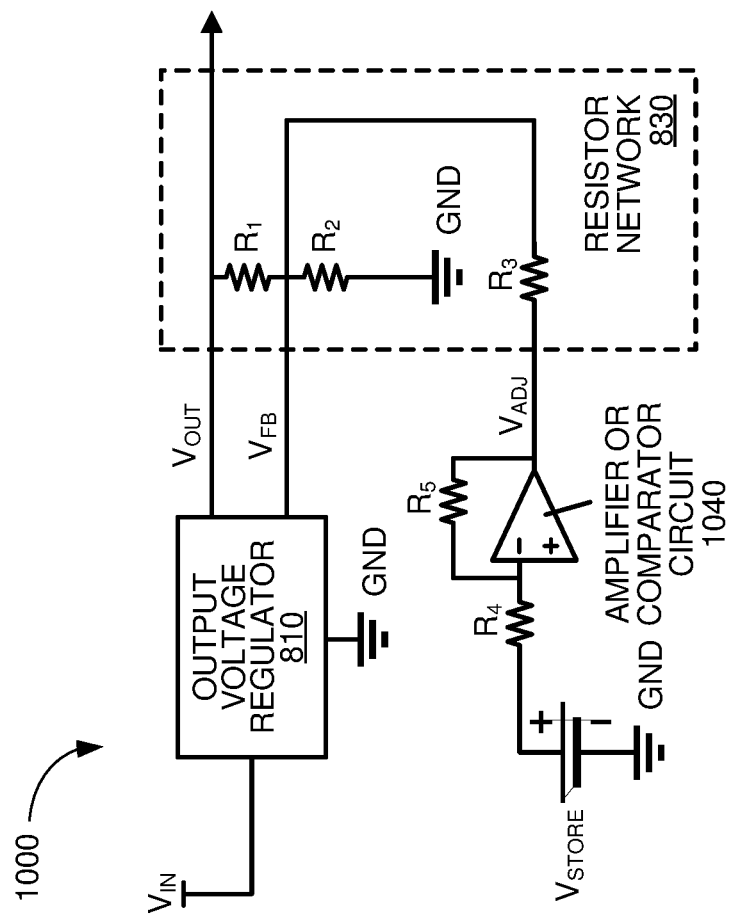
FIG. 10 depicts example voltage regulator circuitry, according to some embodiments.

FIG. 10 depicts example voltage regulator circuitry 1000, according to some embodiments. More specifically, the voltage regulator circuitry 1000 depicts an example illustrating analog control of the voltage regulator. As illustrated in the example of FIG. 10, the voltage regulator circuitry 1000 includes output voltage regulator 810, an amplifier or comparator circuit 1040 including resistors $R_4$ and $R_5$, and a resistor network 830. A voltage store $V_{STORE}$ is also shown which may or may not be part of the voltage regulator circuitry 1000.

Figure 11:
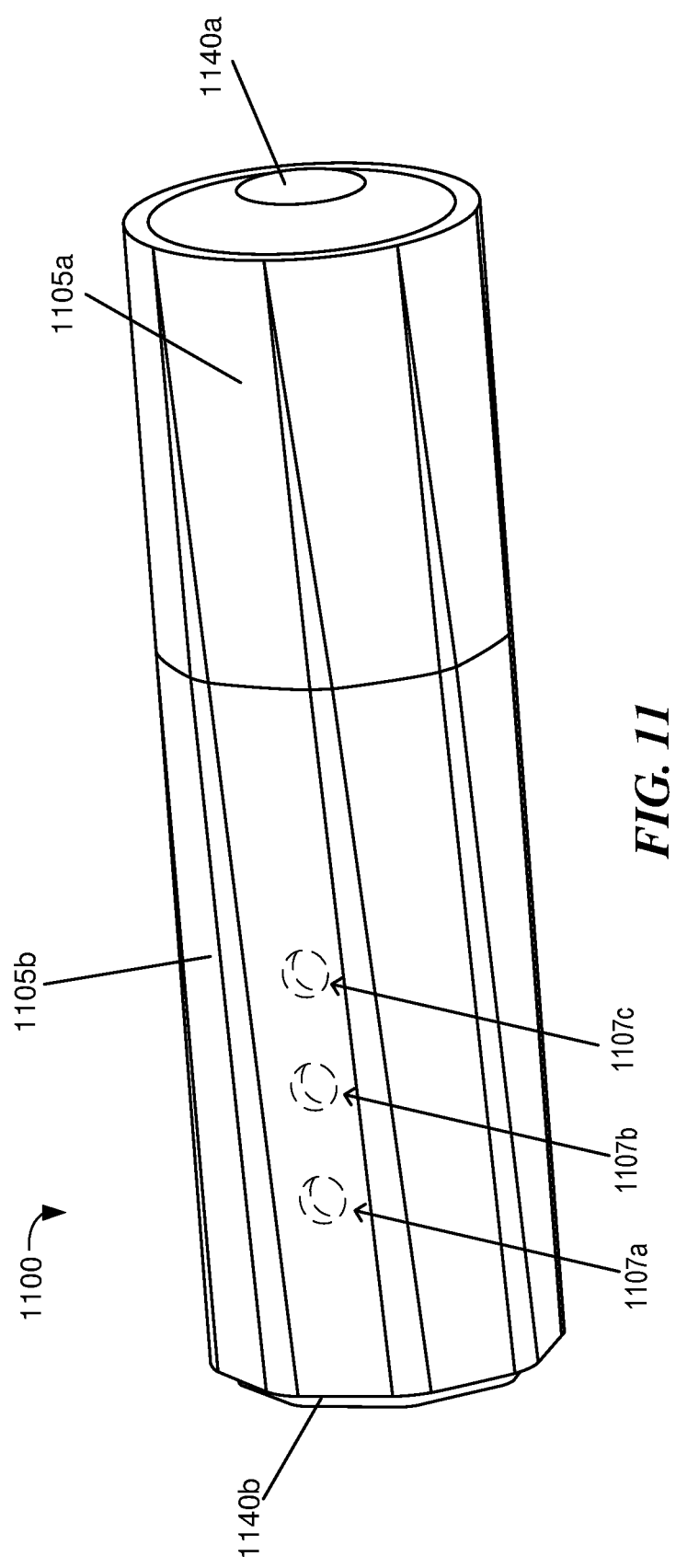
FIG. 11 depict an example wirelessly chargeable energy storage apparatus configured in dimensions that conform to a standard AA type battery, according to some embodiments.

FIG. 11 depicts an example wirelessly chargeable energy storage apparatus 1100 configured in dimensions that conform to a standard AA type battery, according to some embodiments. More specifically, FIG. 11 illustrates a wirelessly chargeable energy storage apparatus with a two-piece detachable housing 1105a and 1105b situated in an attached position. As shown in the example of FIG. 11, when attached, the housing is circular near a first terminal cap 1140a and gradually becomes hexagonal near a second terminal cap 1140b. Additionally, terminal cap 1140a is circular and terminal cap 1140b is hexagonal. The housing piece 1105b includes interfaces 1107a-c. Interfaces 1107a-c can include external switches which can, for example, enable or disable the wirelessly chargeable battery apparatus 1100, e.g., sleep or awake mode, etc. The interfaces 1107a-c can also include indicator interface such as, for example, indicator lights or light emitting diodes (LEDs), etc. In some embodiments, light emitting diodes (LEDs) can be used to indicate various statuses of the wirelessly chargeable battery apparatus. For example, an LED can display a particular color to indicate a battery charging state (e.g., low, med, or high). Other user interface embodiments are also possible.

Figure 12:
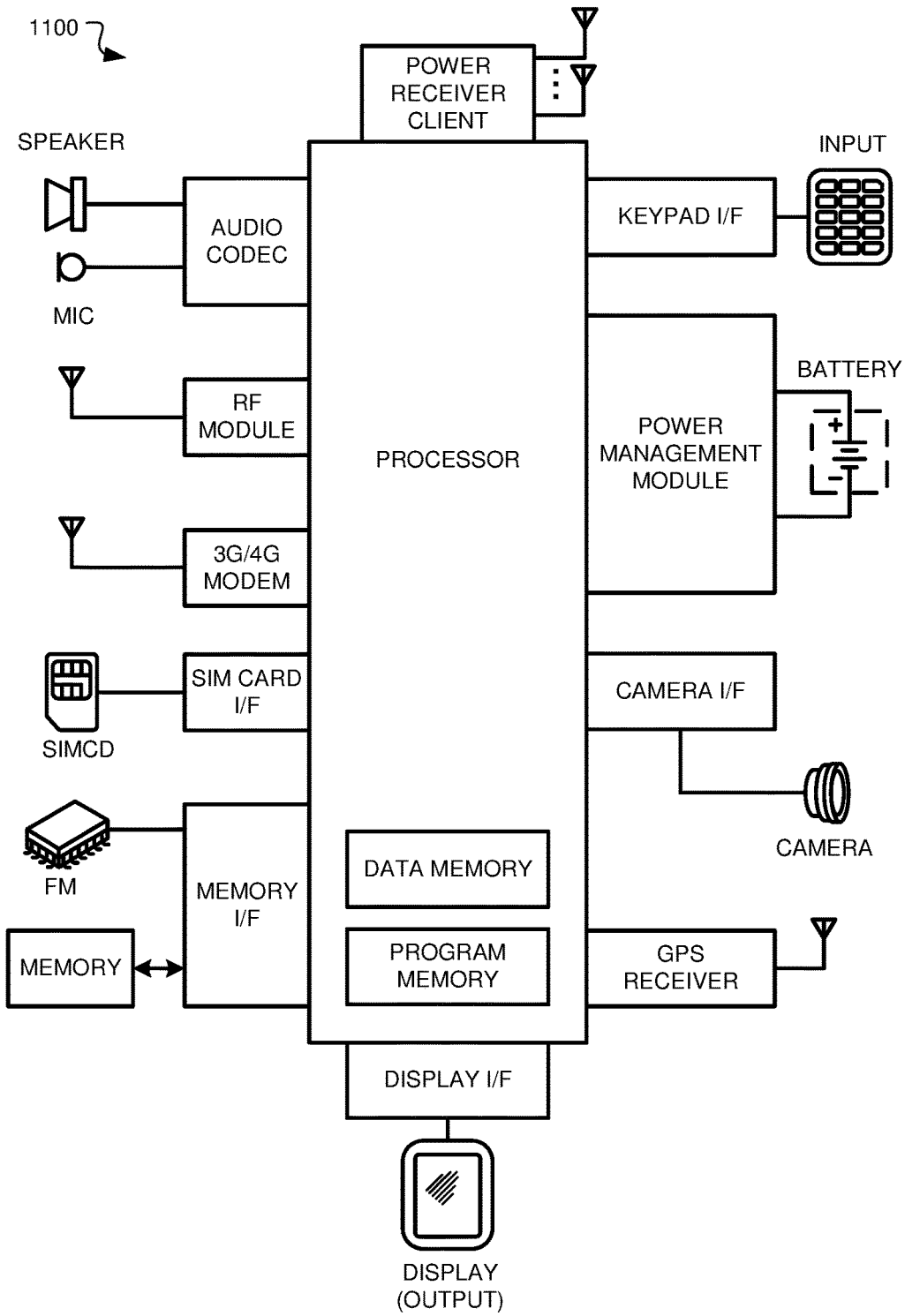
FIG. 12 depicts a block diagram illustrating example components of a representative mobile device or tablet computer with a wireless power receiver or client in the form of a mobile (or smart) phone or tablet computer device, according to some embodiments.

FIG. 12 depicts a block diagram illustrating example components of a representative mobile device or tablet computer 1200 with a wireless power receiver or client in the form of a mobile (or smart) phone or tablet computer device, according to an embodiment. Various interfaces and modules are shown with reference to FIG. 12, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver clients 103 of FIG. 1, although alternative configurations are possible. Additionally, the wireless power receiver client can include one or more RF antennas for reception of power and/or data signals from a charger, e.g., charger 101 of FIG. 1.

Figure 13:
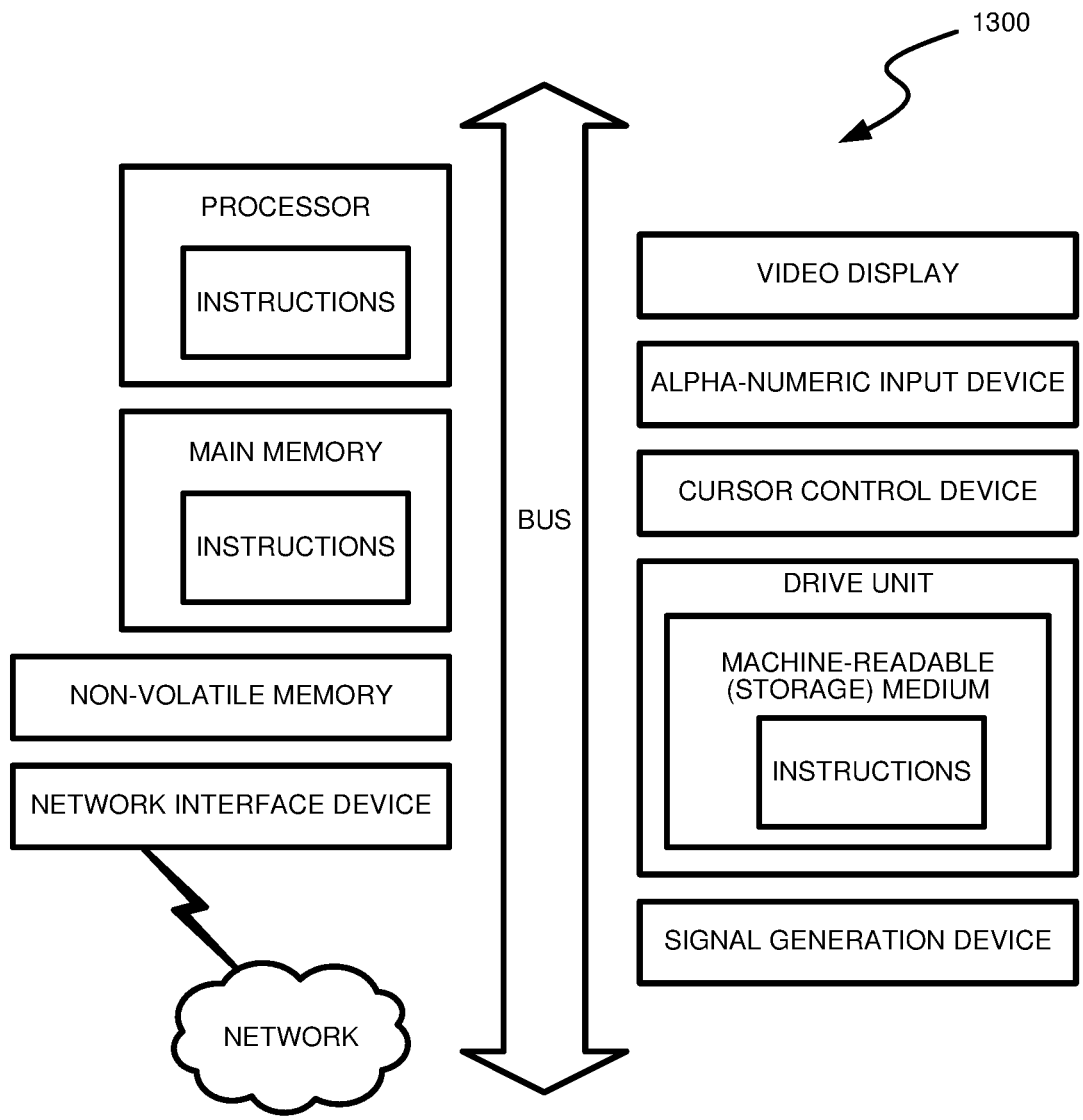
FIG. 13 depicts a diagrammatic representation of a machine, in the example form, of a computer system within which a set of instructions, for causing the machine to perform any one or more of the methodologies discussed herein, may be executed.

FIG. 13 depicts a diagrammatic representation of a machine, in the example form, of a computer system within which a set of instructions, for causing the machine to perform any one or more of the methodologies discussed herein, may be executed.

In the example of FIG. 13, the computer system includes a processor, memory, non-volatile memory, and an interface device. Various common components (e.g., cache memory) are omitted for illustrative simplicity. The computer system 1300 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 13 reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A wirelessly chargeable energy storage apparatus comprising:
   one or more antennas for receiving wireless radio frequency (RF) power from a wireless power delivery system;
   power reception circuitry for converting the received wireless RF power to direct current (DC) power;
   one or more energy storage devices configured to store the converted DC power; and
   voltage regulator circuitry configured to actively modify an output voltage ($V_{OUT}$) of the wirelessly chargeable energy storage apparatus based on an internal state of the apparatus, the voltage regulator circuitry including:
   control circuitry coupled to the one or more energy storage devices for receiving a voltage of the one or more energy storage devices, and configured to:
   determine the internal state; and
   transmit an adjustment control signal including an adjustment voltage ($V_{ADJ}$) based on the internal state;
   an output voltage regulator coupled to the control circuitry for receiving a feedback voltage ($V_{FB}$); and
   a resistor network for modifying the adjustment voltage ($V_{ADJ}$) coupled to and between the control circuitry and the output voltage regulator,
   wherein the output voltage regulator is configured to provide the output voltage ($V_{OUT}$) based on the feedback voltage ($V_{FB}$), and
   wherein the feedback voltage ($V_{FB}$) is based on the adjustment voltage ($V_{ADJ}$) as modified by the resistor network.

2. The wirelessly chargeable energy storage apparatus of claim 1, wherein the control circuitry comprises a digital processing unit configured to determine the internal state of the wirelessly chargeable energy storage apparatus.

3. The wirelessly chargeable energy storage apparatus of claim 2, wherein the digital processing unit includes wireless communications functionality.

4. The wirelessly chargeable energy storage apparatus of claim 3, wherein the internal state of the wirelessly chargeable energy storage apparatus is determined, at least in part, based on wireless data communication signals received by the digital processing unit.

5. The wirelessly chargeable energy storage apparatus of claim 2 further comprising a digital-to-analog converter (DAC) coupled to and between the digital processing unit and the output voltage regulator.

6. The wirelessly chargeable energy storage apparatus of claim 1, wherein the internal state comprises a charge state of the one or more energy storage devices.

7. The wirelessly chargeable energy storage apparatus of claim 1, wherein the one or more energy storage devices have standardized battery dimensions including a form factor of one of a: AA, AAA, C, D, 4.5-volt, 9-volt, and Lantern (spring), battery.

8. The wirelessly chargeable energy storage apparatus of claim 1, wherein the resistor network is a three-resistor network consisting of:
   a first resistor ($R_1$) coupled to and between a first node defining the output voltage ($V_{OUT}$) and a second node defining the power supply feedback voltage ($V_{FB}$);
   a second resistor ($R_2$) coupled to and between the second node and ground; and
   a third resistor ($R_3$) coupled to and between the control circuitry and the second node.

9. The wirelessly chargeable energy storage apparatus of claim 8, wherein the three-resistor network adheres to the following equation:

$$0 = \frac{V_{ADJ} - V_{FB}}{R_3} + \frac{V_{OUT} - V_{FB}}{R_1} + \frac{0 - V_{FB}}{R_2}.$$

10. The wirelessly chargeable energy storage apparatus of claim 1 further comprising a housing.

11. The wirelessly chargeable energy storage apparatus of claim 10, wherein the housing is configured in dimensions that conform to standardized battery dimensions.

12. The wirelessly chargeable energy storage apparatus of claim 10, wherein the one or more antennas are situated within the housing.

13. The wirelessly chargeable energy storage apparatus of claim 10, wherein the power reception circuitry is situated within the housing.

14. The wirelessly chargeable energy storage apparatus of claim 10, wherein the voltage regulator circuitry is situated within the housing.

15. The wirelessly chargeable energy storage apparatus of claim 1, wherein the housing comprises contacts configured to electrically couple the one or more energy storage devices with battery contact portions of a battery-powered device.

16. A method for actively regulating output voltage ($V_{OUT}$) of a wirelessly chargeable energy storage apparatus, the method comprising:
   receiving, by the wirelessly chargeable energy storage apparatus, directed wireless radio frequency (RF) power from a wireless power delivery system;
   converting the received wireless RF power to direct current (DC) power;
   storing the converted DC power in one or more energy storage devices;
   receiving, by control circuitry of the wirelessly chargeable energy storage apparatus, a voltage of the one or more energy storage devices;
   determining, by the control circuitry, an internal state of the wirelessly chargeable energy storage apparatus;
   transmitting, by the control circuitry, an adjustment control signal including an adjustment voltage ($V_{ADJ}$) based on the internal state;
   receiving, by an output voltage regulator of the wirelessly chargeable energy storage apparatus coupled to the control circuitry, a feedback voltage ($V_{FB}$);

modifying, by a resistor network coupled to and between the control circuitry and the output voltage regulator, the adjustment voltage ($V_{ADJ}$); and providing, by the output voltage regulator, the output voltage ($V_{OUT}$) of the wirelessly chargeable energy storage apparatus based on the feedback voltage ($V_{FB}$), wherein the feedback voltage ($V_{FB}$) is based on the adjustment voltage ($V_{ADJ}$) as modified by the resistor network.

17. The method of claim 16, wherein the wirelessly chargeable energy storage apparatus includes a housing that conforms to standardized battery dimensions.

18. The method of claim 16, wherein the internal state comprises a charge state of the one or more energy storage devices.

19. A voltage regulator circuit comprising:
control circuitry operable to:
 receive a voltage of one or more energy storage devices of a wirelessly chargeable energy storage apparatus;
 determine an internal state of the wirelessly chargeable energy storage apparatus; and
 responsively induce an adjustment voltage ($V_{ADJ}$) based on the internal state;

an output voltage regulator coupled to the control circuitry, and operable to:
 induce a power supply feedback voltage ($V_{FB}$); and
 induce an output voltage ($V_{OUT}$) of the wirelessly chargeable energy storage apparatus based on the adjustment voltage ($V_{ADJ}$); and a resistor network coupled to and between the control circuitry and the output voltage regulator, and operable to adjust the output voltage ($V_{OUT}$) based on the power supply feedback voltage ($V_{FB}$) and the adjustment voltage ($V_{ADJ}$).

20. The voltage regulator circuit of claim 19, wherein the resistor network includes:
 a first resistor coupled to and between a first node defining the output voltage ($V_{OUT}$) and a second node defining the power supply feedback voltage ($V_{FB}$); and
 a second resistor coupled to and between the control circuitry and the second node.

21. The voltage regulator circuit of claim 19, wherein the control circuitry includes an amplifier or comparator circuit.

* * * * *

UNITED STATES PATENT AND TRADEMARK OFFICE
CERTIFICATE OF CORRECTION

PATENT NO. : 11,146,093 B2
APPLICATION NO. : 15/942747
DATED : October 12, 2021
INVENTOR(S) : Hatem Ibrahim Zeine et al.

It is certified that error appears in the above-identified patent and that said Letters Patent is hereby corrected as shown below:

In the Claims

Column 15, Line 14, delete "($V_{AJ}$)" and insert --($V_{ADJ}$)--

Signed and Sealed this
First Day of November, 2022

Katherine Kelly Vidal
*Director of the United States Patent and Trademark Office*